US010951132B2

(12) United States Patent
Ge et al.

(10) Patent No.: US 10,951,132 B2
(45) Date of Patent: Mar. 16, 2021

(54) ELECTROSTATIC ROTATING-MACHINE EMPLOYING DIELECTRIC SUBSTRATES WITH SURFACE CONDUCTORS

(71) Applicant: Wisconsin Alumni Research Foundation, Madison, WI (US)

(72) Inventors: Baoyun Ge, Madison, WI (US); Daniel Colin Ludois, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 431 days.

(21) Appl. No.: 15/453,338

(22) Filed: Mar. 8, 2017

(65) Prior Publication Data

US 2017/0338750 A1 Nov. 23, 2017

Related U.S. Application Data

(60) Provisional application No. 62/337,470, filed on May 17, 2016.

(51) Int. Cl.
*H02N 1/00* (2006.01)

(52) U.S. Cl.
CPC ............... *H02N 1/002* (2013.01); *H02N 1/00* (2013.01)

(58) Field of Classification Search
CPC .......... H02N 1/006; H02N 1/004; H02N 1/08; H02N 1/00; H02N 1/002
USPC ........................................ 310/300, 308, 309
See application file for complete search history.

(56) References Cited

U.S. PATENT DOCUMENTS

| 3,210,643 | A | * | 10/1965 | Else | H02N 1/08 |
| | | | | | 310/309 |
| 3,433,981 | A | * | 3/1969 | Bollee | H02N 1/004 |
| | | | | | 310/309 |
| 3,436,630 | A | * | 4/1969 | Bollee | H02N 1/004 |
| | | | | | 310/308 |
| 3,700,983 | A | * | 10/1972 | Goetzl | H01G 5/0138 |
| | | | | | 361/279 |
| 4,754,185 | A | * | 6/1988 | Gabriel | H02N 1/004 |
| | | | | | 310/309 |
| 6,116,257 | A | * | 9/2000 | Yokota | F15B 21/065 |
| | | | | | 137/1 |
| 7,230,364 | B2 | * | 6/2007 | Odaka | H02N 1/004 |
| | | | | | 310/309 |
| 7,239,065 | B2 | * | 7/2007 | Horst | H02N 1/004 |
| | | | | | 310/309 |
| 7,388,315 | B2 | * | 6/2008 | Odaka | H02N 1/004 |
| | | | | | 310/309 |
| 7,521,836 | B2 | * | 4/2009 | Horst | H02N 1/004 |
| | | | | | 310/309 |
| 7,834,513 | B2 | * | 11/2010 | Post | H02N 1/08 |
| | | | | | 310/309 |

(Continued)

FOREIGN PATENT DOCUMENTS

| EP | 0687703 | * | 12/1995 | C08J 5/24 |
| GB | 1119336 | * | 7/1968 | H02N 1/08 |

*Primary Examiner* — Burton S Mullins
(74) *Attorney, Agent, or Firm* — Boyle Fredrickson, S.C.

(57) ABSTRACT

An electrostatic rotating electrical machine employs axially extending electrically conductive electrodes on a rotor interacting with a corresponding set of axially extending electrodes on a stator, where the electrodes are supported at an outer surface of a dielectric sleeve which continues beneath the electrodes to provide a robust support and to minimize electrode weight.

4 Claims, 13 Drawing Sheets

(56) References Cited

U.S. PATENT DOCUMENTS

| | | | |
|---|---|---|---|
| 2006/0214535 A1* | 9/2006 | Salmon | H02N 1/004 |
| | | | 310/309 |
| 2013/0043762 A1 | 2/2013 | Ludois et al. | |
| 2013/0106317 A1 | 5/2013 | Ludois | |
| 2014/0175941 A1* | 6/2014 | Johnson | H02N 1/006 |
| | | | 310/309 |
| 2014/0197710 A1 | 7/2014 | Ludois et al. | |
| 2014/0252914 A1* | 9/2014 | Post | H02N 1/08 |
| | | | 310/309 |
| 2015/0255209 A1 | 9/2015 | Ludois | |
| 2016/0028328 A1 | 1/2016 | Ludois | |
| 2016/0099663 A1 | 4/2016 | Petrowsky et al. | |
| 2016/0211775 A1 | 7/2016 | Ge et al. | |
| 2016/0329780 A1 | 11/2016 | Reed et al. | |
| 2016/0344306 A1 | 11/2016 | Ge et al. | |
| 2017/0047161 A1 | 2/2017 | Ludois et al. | |

* cited by examiner

ELECTROSTATIC ROTATING-MACHINE EMPLOYING DIELECTRIC SUBSTRATES WITH SURFACE CONDUCTORS

CROSS REFERENCE TO RELATED APPLICATION

This application claims the benefit of U.S. provisional application 62/337,470 filed May 17, 2016, and hereby incorporated by reference.

STATEMENT REGARDING FEDERALLY SPONSORED RESEARCH OR DEVELOPMENT

This invention was made with government support under 1452230 and 1534684 awarded by the National Science Foundation. The government has certain rights in the invention.

BACKGROUND OF THE INVENTION

The present invention relates to rotating electrical machines (e.g., electrical motors and generators) and in particular to a rotating electrical machine employing axially or radially extending surfaces.

Electrical motors and generators share similar structures of an electrically interacting, stator and rotor and may be collectively termed "rotating electrical machines." Conventional rotating electrical machines may be roughly divided into "electromagnetic" devices exploiting magnetic fields between moving parts, and "electrostatic" devices exploiting electrical fields between moving parts.

Electrostatic rotating electrical machines have a number of advantages over conventional electromagnetic rotating electrical machines including the elimination of magnets and costly rare earth materials, significant weight from ferrous materials, and high-current copper windings. Electrostatic machines may be made of lower weight/cost dielectric materials and conductors.

Electrostatic machines are commonly found in micro-scale, micro-electromechanical systems (MEMS) which permit extremely small gaps between rotor and stator elements allowing high capacitance between surfaces and high electrical fields. For larger scale rotating machines, for example, those providing integer horsepower and larger outputs (macro-scale), the physical gap between the stator and rotor may be one to three orders of magnitude larger than that for MEMS machines. This larger gap requires higher applied voltages typically in the thousands or even tens of thousands of volts for comparable shear stress (electric field strength) in the rotor/stator gap to attain useful amounts of torque. These high voltages normally require ultra high vacuum containment vessels to prevent arcing between stator and rotor components. The simultaneous requirement of minimizing the gap (tolerances) between stator and rotor components and using high voltage driving power, in macro-scale rotating machines, can present significant manufacturing challenges in manufacturing macro-scale electrostatic motors.

U.S. patent application Ser. No. 14/598,411 filed Jan. 16, 2015, assigned to the assignee of the present invention and hereby incorporated by reference, describes an electrostatic rotating machine that simplifies manufacture by eliminating plates in favor of interdigitated conductive pegs immersed in a high dielectric strength, high relative permittivity fluid. The peg-style construction allows increased design flexibility through modification of peg spacing alignment and dimensions, allowing variations in capacitance as a function of rotation to be maximized and closely matched with available driving voltages/currents for improved torque and torque consistency. Torque is generated in the reference patent by means of variable capacitance. As the shaft of the machine turns, the capacitance among the rotor and stator pegs varies. Applying voltage to specific pin sets will produce torque proportional to the derivative of the capacitance with respect to position. This torque mechanism is the dual to electromagnetic reluctance based machines.

U.S. patent application Ser. No. 14/715,214 filed May 18, 2015, assigned to the assignee of the present invention and hereby incorporated by reference, describes an improvement in the above-referenced peg-style electrostatic machine which uses dielectric sleeves that may fit around rows of pegs. The sleeves may be constructed of a low permittivity material to shape the electrostatic field, between the pegs of the rotor and/or stator to provide improved torque characteristics and tailoring of leakage flux or mechanical or drag properties.

SUMMARY OF THE INVENTION

The present invention provides an improved sleeve design in which the mass and bulk of the pegs is decreased in favor of a greater exposed surface area provided by thin electrodes on outer walls of the dielectric sleeve. By allowing the remainder of the sleeve to be a continuous piece improved mechanical strength at a reduced cross-section can be obtained. The transformation of the interior pegs into thin surface electrodes greatly reduces rotor weight and allows the possibility of a variety of alternative manufacturing techniques to be used to fabricate the machine. The present invention also provides a set of optimal dimensions for electrodes produced. Specifically then, in one embodiment, the invention provides an electrostatic machine having a stator assembly providing an insulating support extending circumferentially about an axis and a rotor assembly providing an insulating support extending circumferentially about the axis and supported to rotate about the axis is respect to the stator assembly. The insulating supports of the stator assembly and rotor assembly provide corresponding opposed faces supporting respectively circumferentially displaced conductive stator electrodes and circumferentially displaced conductive rotor electrodes and at least one of the insulating supports of the stator assembly provides a continuous insulating support behind the corresponding electrodes with respect to the opposed face of the rotor.

It is thus a feature of at least one embodiment of the invention to move the active area of the rotor electrodes outward in the dielectric to simplify manufacturing and reduce rotor mass. It is another feature of at least one embodiment of the invention to provide a substantially continuous and thus mechanically stronger electrode support structure having portions largely unbroken by intervening electrodes.

The corresponding opposed surfaces maybe separated by substantially constant separation distance and/or the corresponding opposed surfaces may be substantially continuous and smooth It is thus a feature of at least one embodiment of the invention to preserve smooth surfaces on the rotor and stator for reduced drag with respect to a dielectric fluid between the rotor and stator.

A thickness of the conductive rotor electrodes maybe less than a thickness of the insulating support beneath the conductive rotor electrode measured perpendicularly to the opposed surfaces at the conductive rotor electrode.

It is thus a feature of at least one embodiment of the invention to substantially reduce the need for strength in the electrodes in favor of an underlying insulating support permitting, for example, thin deposited electrodes on a mechanically optimized substrate.

The electrostatic machine may include a first and second stator assembly each providing a plurality of circumferentially separated conductor stator electrodes, the first and second stator elements flanking the at least one rotor assembly and the at least one rotor assembly may include circumferentially separated conductive rotor electrodes supported by and exposed at opposed faces of the insulating support of the rotor assembly facing respective different of the first and second stator assemblies.

It is thus a feature of at least one embodiment of the invention to provide similar benefits to the rotor in the stator construction.

The conductive stator electrodes and conductive rotor electrodes maybe separated radially or axially by a separation distance g and each may have a thickness along the separation of d, an exposed circumferential width of w, and a circumferential period of l, and each electrode may have a width-to-thickness ratio w/d of at least 5 to 1.

It is thus a feature of at least one embodiment of the invention to permit extremely thin electrodes reducing the weight of the stator while also increasing electrical performance by increasing the tangential component of field in the direction of rotation generated by the electrodes.

Alternatively and/or in addition, the ratio of width to circumferential period (w/l) of the electrodes may be within a range of 0.4-0.8.

It is thus a feature of at least one embodiment of the invention to provide an optimized electrode spacing facilitated by the present inventions separation of the functions of mechanical support and electrode conduction.

Alternatively and/or in addition, the ratio of separation distance to circumferential period g/l may be within a range of 0.1-0.3.

It is thus a feature of at least one embodiment of the invention to permit optimization of the rotor/stator separation for a given motor design.

The circumferential width w, electrode thickness d, rotor/stator gap g and circumferential period l are optimized to according to the formula:

$$\frac{w}{l} = \sum_{0 \leq i,j \leq 5} c_{ij} \left(\frac{g}{l}\right)^i \left(\frac{d}{g}\right)^j \pm 5\%$$

where:

$c_{00} = 0.4875$
$c_{01} = 0.03947$
$c_{02} = -0.01841$
$c_{03} = 0.007389$
$c_{04} = -0.002732$
$c_{05} = 0.0003844$
$c_{10} = -0.1742$
$c_{11} = -1.632$
$c_{12} = 0.565$
$c_{13} = -0.09538$
$c_{14} = 0.008316$
$c_{15} = 0$
$c_{20} = -1.456$ $c_{21} = 4.766$
$c_{22} = -0.663$
$c_{23} = 0.002834$
$c_{24} = 0$
$c_{25} = 0$
$c_{30} = 1.207$
$c_{31} = -6.1$
$c_{32} = 0.3677$
$c_{33} = 0$
$c_{34} = 0$
$c_{35} = 0$
$c_{40} = 3.884$
$c_{41} = 3.007$
$c_{42} = 0$
$c_{43} = 0$
$c_{44} = 0$
$c_{45} = 0$
$c_{50} = -4.128$
$c_{51} = 0$
$c_{52} = 0$
$c_{53} = 0$
$c_{54} = 0$
$c_{55} = 0$

It is thus a feature of at least one embodiment of the invention to provide an optimum configuration of surface electrodes on a dielectric material in this configuration.

The nonconductive support material may be a fiber-reinforced polymer.

It is thus a feature of at least one embodiment of the invention to permit the fabrication of the rotor and stator from common materials susceptible to implementation as composites or fabrication by injection molding, printing, and the like.

The axially extending tubular sleeve of dielectric material may provide an insulator coated with a different low permittivity material with a permittivity of less than three proximate to the plurality of axially extending conductive rotor electrodes.

It is thus a feature of at least one embodiment of the invention to permit separate optimization of the mechanical and electrical structures of the rotor and stator.

These particular objects and advantages may apply to only some embodiments falling within the claims and thus do not define the scope of the invention.

DETAILED DESCRIPTION OF THE PREFERRED EMBODIMENT

The invention contemplates that it may be used in a variety of different motor designs providing different torque mechanisms.

The first torque mechanism is caused by variable capacitance between stator and rotor pegs, much as in the reference patent. Here the sleeve may be of a low permittivity material and may be used to shape the electrostatic field between the pegs of the rotor and stator for improved torque characteristics and tailoring of leakage flux. Leakage flux refers to the electric field that couples between the stator pegs and/or rotor pegs, that doesn't contribute to torque production. Generally it is the purpose of the sleeve to lower leakage flux between stator pegs, or between the rotor pegs, as leakage flux does not contribute to the production of torque. The sleeve may also help tailor the variability of the mutual capacitance between rotor and stator pegs with respect to position.

The second torque mechanism is electrostatic induction. Here, the sleeves may provide for a low or high permittivity material which manages leakage flux or enhances capacitive coupling between the stator and rotor with the objective of greater induced charge from the voltages on nearby stator pegs. Induced charge results from voltage applied to the stator pegs, usually balanced three-phase voltages, to create a traveling potential wave in the gap between the stator and rotor. The potential wave induces charge on the rotor. The induced rotor charge lags the stator potential wave, or "slips," thus there is a tangential component to the field between the stator and rotor. The tangential field drags the rotor in an effort to catch it up to stator potential wave, causing torque in a manner roughly analogous to an electromagnetic induction motor. For this torque mechanism, the capacitance between the stator and rotor does not change with position and is more constant. Therefore, the number of pegs on the rotor may approach an infinite number, until a continuous metal surface (sleeve) is formed. The surface is then coated with material that is generally considered a dielectric with finite relative permittivity and resistivity. The product of permittivity and resistivity of a material may be selected to correspond to a particular operating slip, i.e. the normalized difference in rotor and stator rotational speeds. This mechanism is analogous to an electromagnetic induction motor A third mechanism provides the rotor with a DC field from an external voltage source coupled to the rotor by slip rings or the like. This type of electrostatic motor operates analogously to an electromagnetic synchronous motor.

It will be appreciated that the invention is not limited to any single motor design.

I. Exposed Peg Design

Figure 1:
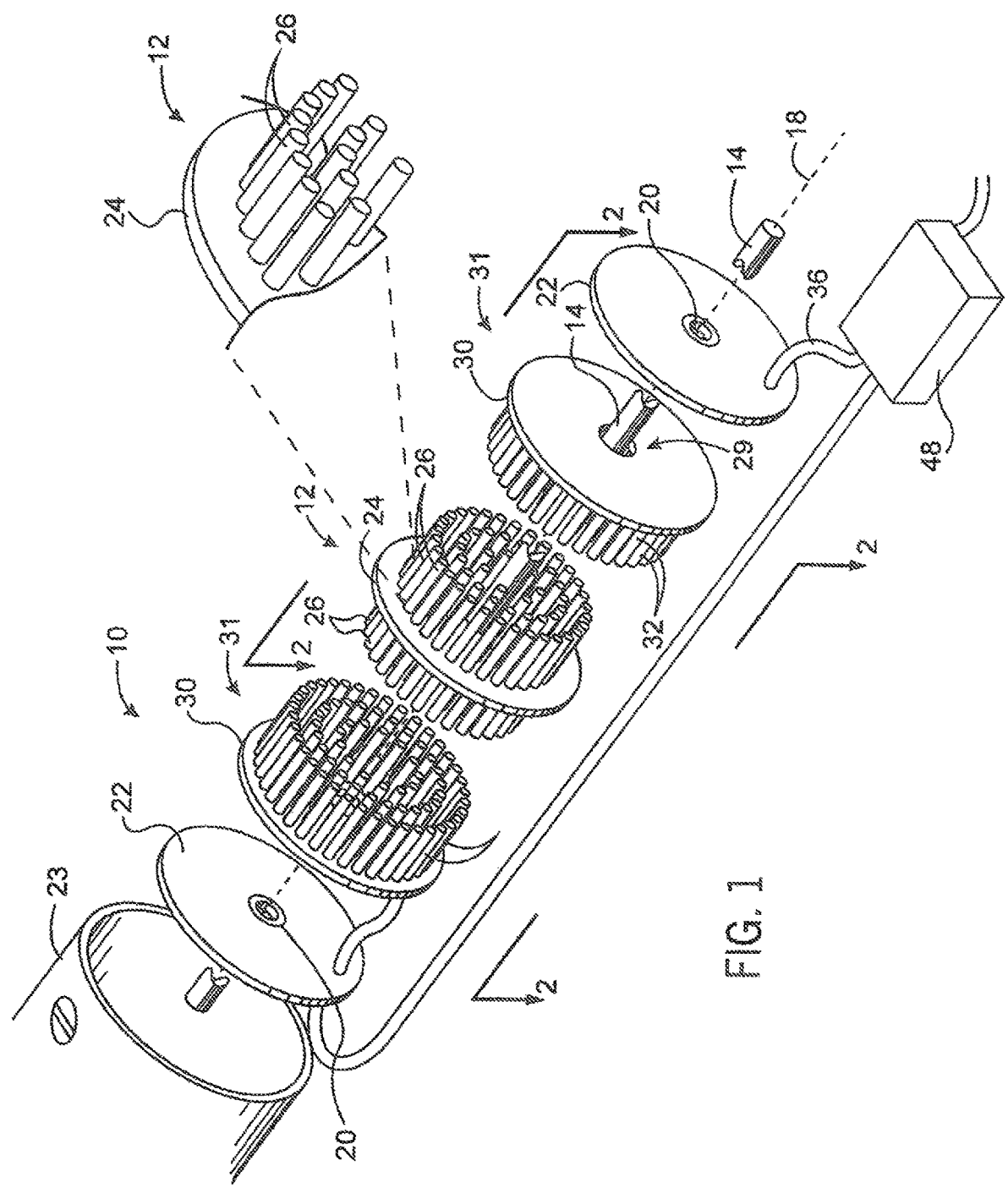
FIG. 1 is an exploded perspective view of one embodiment of the present invention providing overlapping axial pegs extending from rotor and stator elements.

Referring now to FIG. 1, a rotating electrical machine 10 per the present invention may provide a rotor 12 mounted on an axle 14 for rotation about an axis 18. The axle 14 may be supported at opposite ends by bearings 20 in turn held on end plates 22. The axle 14 may pass through one end plate 22 to be attached to other rotating machinery, for example, to provide for a drive torque to that machinery in the manner of a conventional motor or to receive a driving force when the machine 10 is used as a generator.

Figure 2:
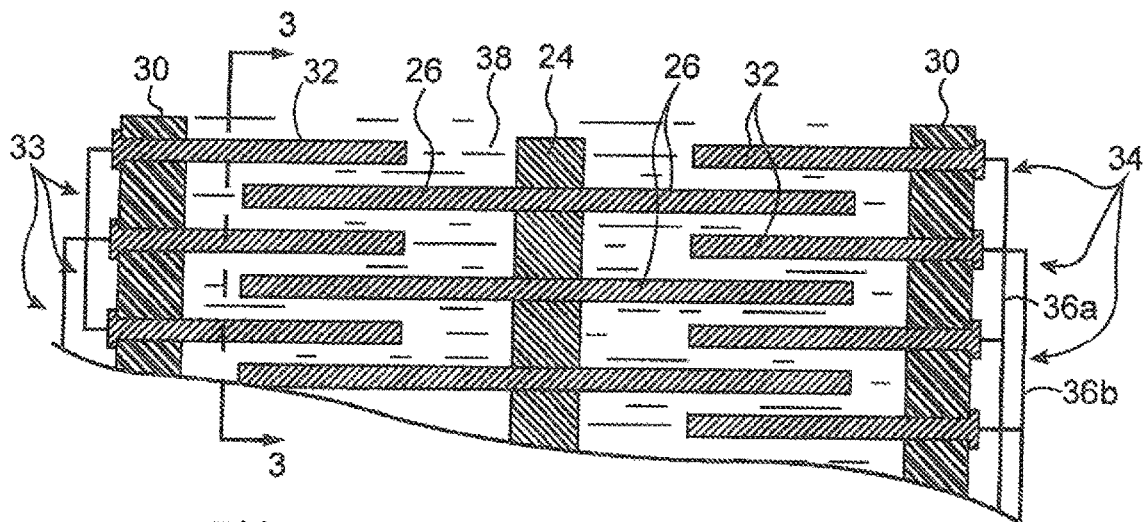
FIG. 2 is a cross-section taken along line 2-2 of FIG. 1 in an unexploded configuration showing overlap of the rotor and stator pegs as immersed in a high dielectric fluid.

Referring also to FIG. 2, rotor 12 may comprise one or more rotor disks 24 extending generally perpendicularly to the axis 18 to rotate with the axle 14. A set of concentrically arranged pegs provide rotor electrodes 26 in constant radius rows 33 may extend from the front and rear surfaces of the rotor disks 24 parallel to the axis 18. Each of the rotor electrodes 26 is electrically conducting and may be either insulated from other rotor electrodes 26 by insulating rotor disks 24 or electrically joined by a conductive rotor disk 24. In one embodiment the rotor electrodes 26 are circular cylinders capped with hemispherical distal ends; however, generally any shape of substantially constant axial cross-section is contemplated and other peg cross-sections may also be used, for example, those offering decreased flow resistance through a fluid.

Flanking each rotor disk 24 along the axis 18 are two stator disks 30 of stators 31 also having peg-shaped axial stator electrodes 32 extending inward toward a respective rotor disk 24 of the rotor 12. The stator disks 30 are generally stationary with respect to the housing 23 and may have a central bore 29 allowing free passage of the axle 14 through the stator disks 30 to the bearings 20.

The stator electrodes 32 are also arranged circumferentially along constant radius rows 34 fitting between the rows 33 of rotor electrodes 26 so that the rotor 12 may rotate without interference between the rotor electrodes 26 and stator electrodes 32. The stator electrodes 32 are also electrically conductive but selectively isolated from each other by an insulating material of the stator disk 30. In a first embodiment, alternate concentric rows 34 of stator electrodes 32 are joined to either a first conductor 36a or second conductor 36b as will be described below.

Each rotor disk 24 and the two stator disks 30 form a three-disk element that may be repeated along the axle 14 with the rotor electrodes 26 and/or stator electrodes 32 and interconnected for parallel or series operation.

The end plates 22 may form part of a housing 23 that together provide an enclosed volume holding the rotor 12 and stator 31 and within which the rotor 12 may rotate. The housing 23 may be filled with a dielectric fluid 38 surrounding the rotor electrodes 26 and stator electrodes 32 to provide insulation therebetween, preventing arcing or other current flow and increasing the dielectric constant in the gaps between the rotor electrodes 26 and stator electrodes 32. In one embodiment, the dielectric fluid 38 may be Vertrel® XF, a hydrocarbon fluid ($C_5H_2F_{10}$) having a dielectric constant (relative permittivity) from 7-10, a breakdown strength of 14,000 to 28,000 volts/mm, a volume resistivity (ohm-cm) of 109-1011 and a viscosity in centipose of (cP) of 0.67. Generally the present invention contemplates a breakdown strength of at least 5000 volts per millimeter and desirably greater than 10,000 volts per millimeter and the dielectric constant of at least five and desirably greater than seven and a viscosity of less than water and desirably less than 15 cP and preferably less than 100 cP.

Figure 3:
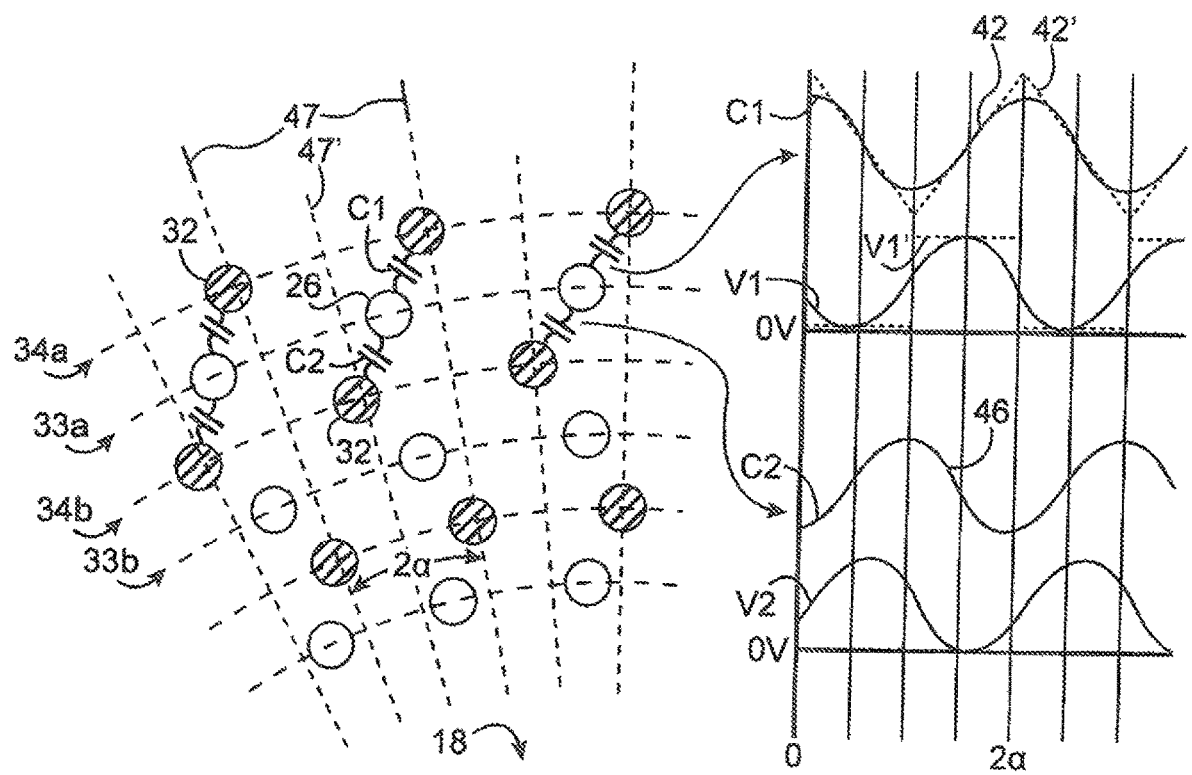
FIG. 3 is a cross-section taken along line 3-3 of FIG. 2 showing Overlap of the rotor and stator pegs together with a plot of a capacitance profile showing mutual capacitance between the two with rotation of the rotor and two possible driving voltages in solid and dotted lines.

Referring now to FIG. 3, in this embodiment, the stator electrodes 32 in each stator row 34, at a given constant radius with respect to the axis 18, may be aligned along radial lines 47 at equal angular spacing of $2\alpha$. Every other stator row 34 of stator electrodes 32, as one moves radially, may be offset in angle from the previous row by $\alpha$. As noted before, every other stator row 34 connects to a different conductor 36a or 36b. The rotor electrodes 26 may also be spaced in rows 33 of constant radius about axis 18 positioned approximately halfway between the rows 34. The rotor electrodes 26 may also have an equal angular spacing of $2\alpha$ and are aligned along rotor lines 47'.

Generally, as a given rotor electrode 26' moves in rotation past a first stator row 34a of stator electrodes 32, the given rotor electrode 26' experiences a mutual capacitance with proximate stator electrodes 32 such that the total mutual capacitance between all rotor electrodes 26 of a given rotor row 34 and the adjacent stator electrodes 32 of stator row 34a (and electrically connected stator rows 34) provide a value C1 that changes with rotational angle. This change in C1 will be termed a capacitive profile and is shown by plotted waveform 42. With the described angular spacing of rotor electrodes 26 and stator electrodes 32, the periodicity of waveform 42 will be $2\alpha$ with peak values of capacitance C1 when rotor electrodes 26 are aligned radially with stator electrodes 32. The torque caused by electrostatic attraction between rotor electrodes 26 and stator electrodes 32 of stator row 34 will be a function of a product of the rate of change of the capacitance C1 and the square of the applied voltage to stator electrodes 32. Accordingly, a voltage waveform V1 applied to stator electrodes 32 will desirably have a nonzero magnitude (including a peak value) during the positive slope of C1 and a low or zero magnitude during the negative slope of C1 (where the resultant torque would be negative and hence counterproductive). A highest average torque is obtained when the highest values in the driving voltage are aligned with the highest positive derivative of C1.

When waveform 42 of C1 is approximately sinusoidal and a sinusoidal driving power is used, maximum average torque is provided using a sinusoidal voltage V1 with the phase lag of 90 degrees ($\alpha/2$) with respect to waveform 42.

Insofar as sinusoidal voltages/currents may be readily obtained for motor driving, a sinusoidal capacitive profile of waveform 42 may be desirably promoted. This capacitive profile is encouraged by matching compact rotor electrodes 26 and stator electrodes 32 as opposed to having one set of pegs extend at substantial width along the circumferential direction such as would tend to promote a trapezoidal waveform 42 providing sections of constant capacitance C1 such as would promote zero torque.

Similarly, if capacitance profile waveform 42 were triangular, as indicated by waveform 42', a square wave voltage signal V1' would provide the highest average torque. Such a square wave can be produced by solid-state switching devices gating a DC voltage/current source.

Note that in both cases the alternating waveform of voltage of V1 or V1' is given a DC offset, i.e. it is a DC value with AC component riding on it. The DC voltage provides a nonzero electrical field and induces electrostatic charge separation in the floating rotor electrodes 26. In another embodiment to be discussed below where direct electrical connection may be had by the rotor electrodes 26, this induced field is not required. The magnitude of the voltage may be reduced to zero by the AC component at certain points when negative torque would otherwise be generated.

Referring still to FIG. 3, the present invention provides a second stator row 34b of stator electrodes 32 staggered with respect to the first stator row 34a of stator electrodes 32 on the rotor disk 24 and positioned to generate a peak torque when the torque produced by stator electrodes 32 of first stator row 34a is lowest thus also providing improved torque consistency. In this case, a waveform 46 of capacitance C2 provides a 180-degree phase relationship with respect to the waveform 42 of capacitance C1, and similarly a voltage V2 with a 180 degrees phase relationship with respect to voltage V1 may be advantageously applied to conductor 36b and stator electrodes 32 of stator row 34b.

Figure 7:
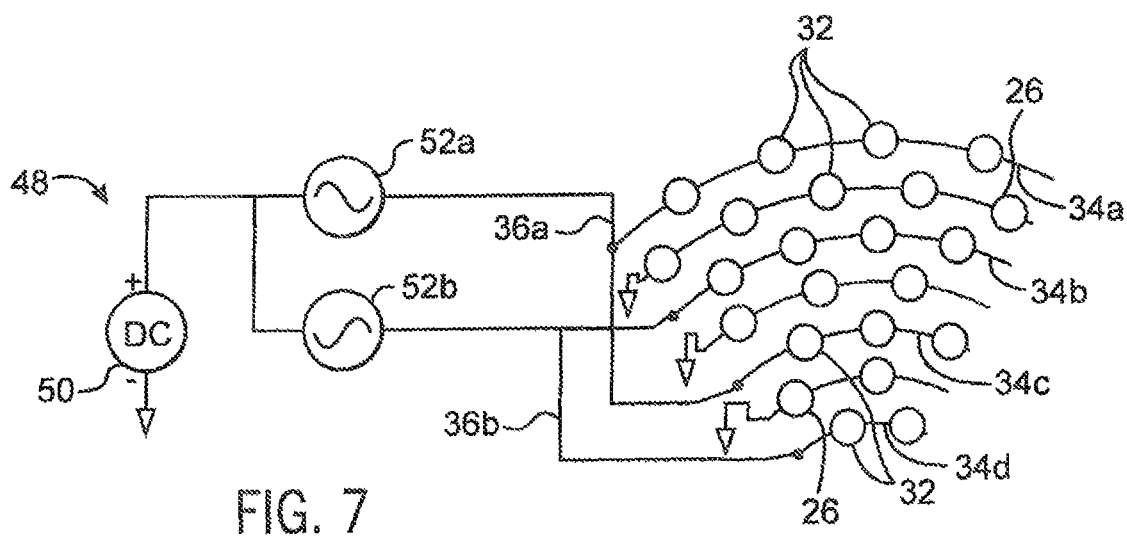
FIG. 7 is a simplified schematic of a power supply for the embodiment of FIG. 3.
Figure 8:
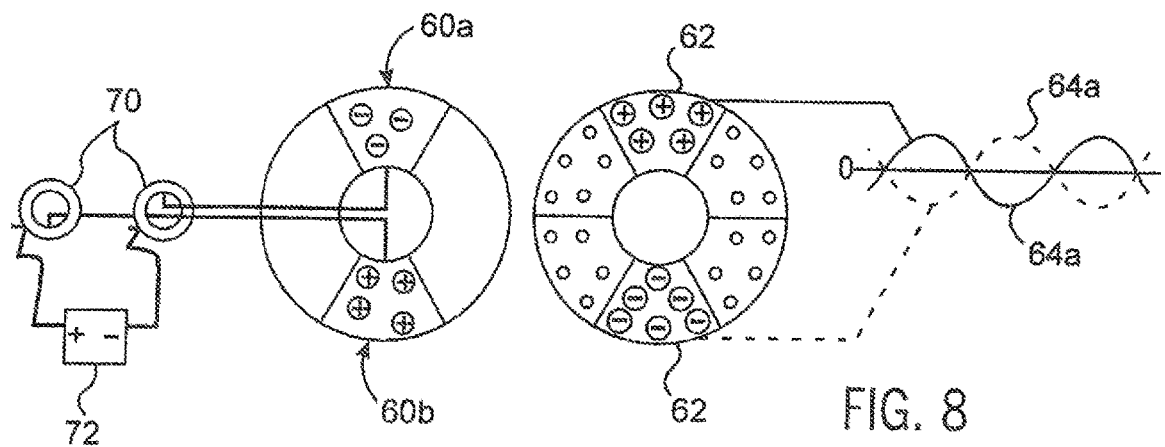
FIG. 8 is a simplified representation of slip rings providing electrical voltage to the rotor of FIG. 4 for improved torque through charge injection.

Referring momentarily to FIG. 7, a power source 48 producing the desired waveforms may employ a DC power supply 50 placed in series with two AC power supplies 52a and 52b, each of these latter AC power supplies 52a and 52b producing identical sinusoidal (square wave) output voltages with 180-degree respective phase difference. These AC power supplies 52a and 52b may be easily implemented by using two independent secondary windings of transformers having a common primary AC input and wiring the two secondaries with opposite polarity.

The AC power supplies 52a and 52b may connect with conductors 36a and 36b, respectively. The return or ground side of DC power supply 50 may be held at the same potential as the rotor electrodes 26, for example, by a brush connection or the like.

Figure 4:
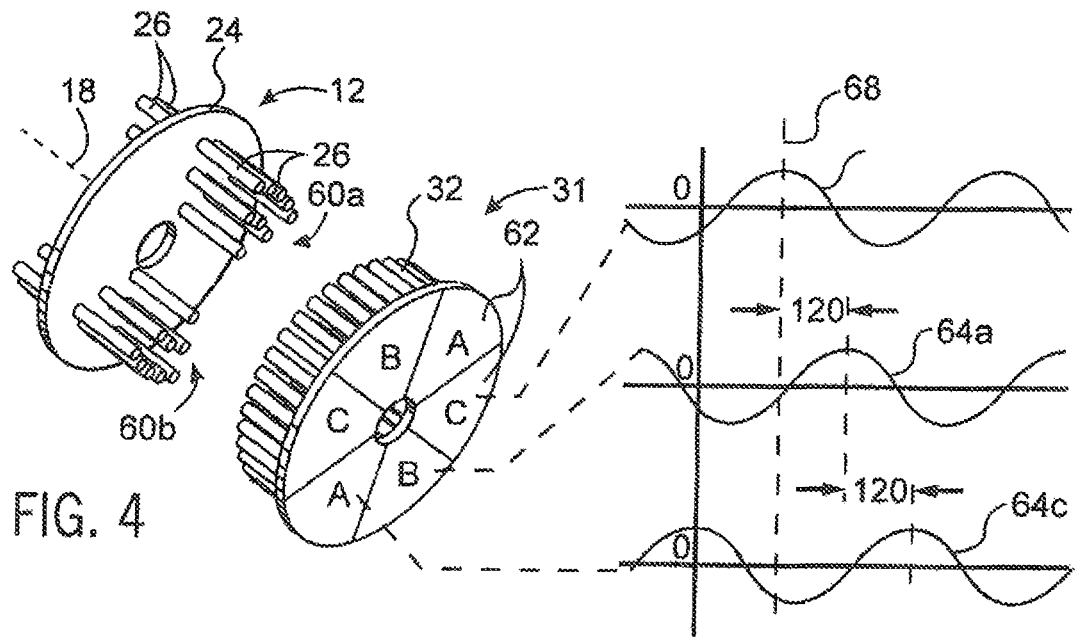
FIG. 4 is a figure similar to that of FIG. 1 showing a rotor and one stator in isolation in a three-phase embodiment with isolated clusters of rotor pegs, also showing a three-phase driving voltage.
Figure 5:
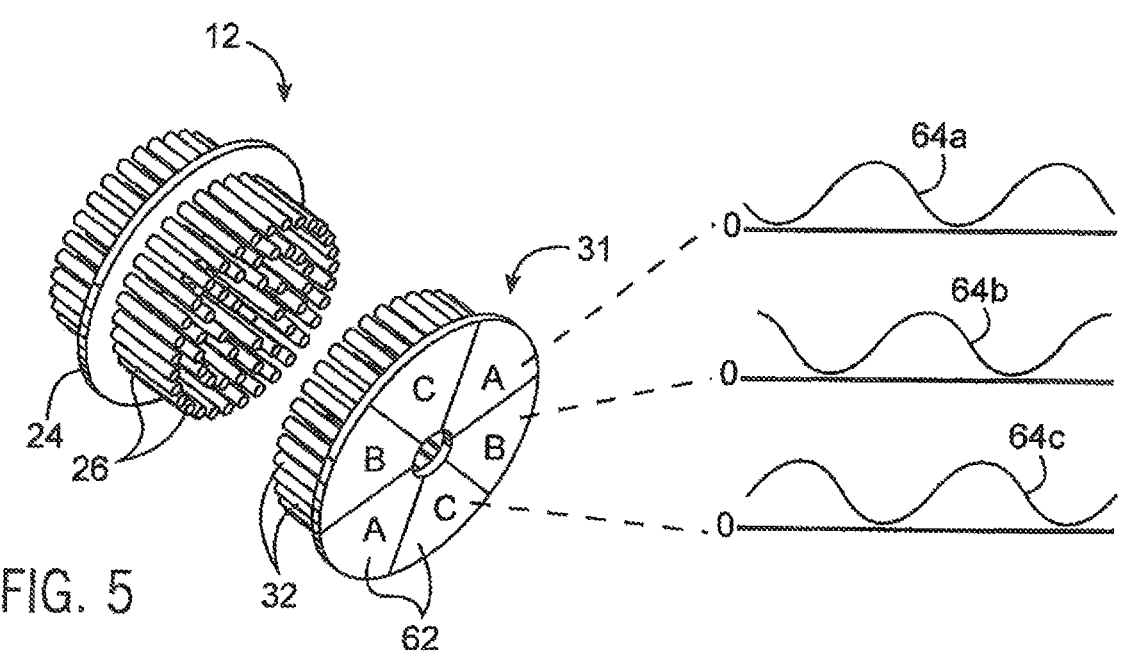
FIG. 5 is a figure similar to that of FIG. 4 showing a three-phase embodiment with a continuous angular range of rotor pegs.

Referring now to FIG. 4, in an alternative embodiment, the rotor electrodes 26 of the rotor 12 may be collected into isolated clusters, for example, angularly opposed rotor clusters 60a and 60b each spanning in this depiction approximately 60 degrees of angular range about axis 18. In contrast, the stator electrodes 32 may still provide a full angular range of 360 degrees about axis 18 but in this case are electrically connected together to form similar sized stator clusters 62, the stator electrodes 32 of each stator cluster 62 communicating with each other but isolated from adjacent stator clusters. So, for example, six stator clusters 62 may be developed each having an angular range of 60 degrees and distributed in sequence about the axis 18. Stator clusters 62 in opposition may be electrically connected together to provide three electrically independent stator clusters 62 labeled A, B, and C.

Each of these stator clusters 62 of A, B, and C may be provided with a different voltage waveform 64a-64c being, for example, different phases of three-phase electrical power providing sinusoidal voltages having a 120 degrees phase difference with the other phases. It will be understood that this connection creates a rotating electrical vector about axis 18 that will apply a corresponding rotational torque to the rotor clusters 60a and 60b. In effect, as the rotor spins, a rotating capacitance wave is also created such that the capacitance rises and falls among the phases. The capacitance and voltage waves must be synchronized. The angle between the rotating waves controls the power/torque output, much as in rotating electromagnetic machinery.

It will be appreciated that the stator clusters 62 need not extend a full 60 degrees as shown but, instead, may extend by as much as 120 degrees for a single stator cluster 62 with a corresponding increase in the size of rotor clusters 60 or conversely may be broken into multiple smaller stator cluster sizes, for example, of 30 degrees, 10 degrees, or even to individual stator radial lines 47. In all cases the stator clusters 62 alternate A, B, C electrical connections. A larger number of stator clusters 62 and rotor clusters 60 will produce a slower motor speed and more uniform motor torque for a given frequency of waveforms 64. As before, the size and numbers of the stator clusters 62 and rotor clusters 60 are matched to accomplish desired operating characteristics. More generally, the angular range of the rotor cluster 60 may be larger than the angular range of the stator cluster 62, for example, being 90 degrees for the rotor cluster 60 and 60 degrees for the stator clusters 62. This allows for a transition from one phase to another that provides an improved capacitance profile.

Figure 6:
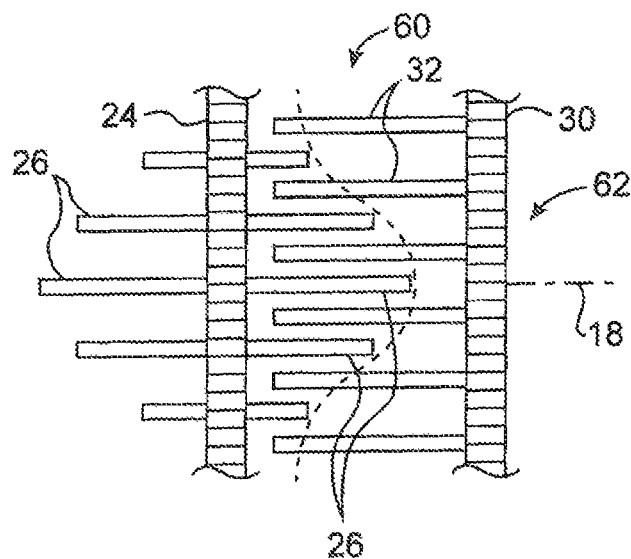
FIG. 6 is a top fragmentary view of overlapping rotor pegs and stator pegs of FIG. 4 showing variation in length of rotor pegs for tailoring the capacitive profile.

Referring now to FIG. 6, the rotor electrodes 26 of each rotor cluster 60 may be given different axial lengths to modify the capacitive profile exhibited as the cluster 60 moves through the stator electrodes 32 of a given cluster 62. This modification of the rotor electrodes 26 may be done to better match the capacitive profile to the driving waveform, for example, to make it more sinusoidal or more triangular. Alternatively, or in addition, the same modification could be done with the stator electrodes 26.

Figure 10:
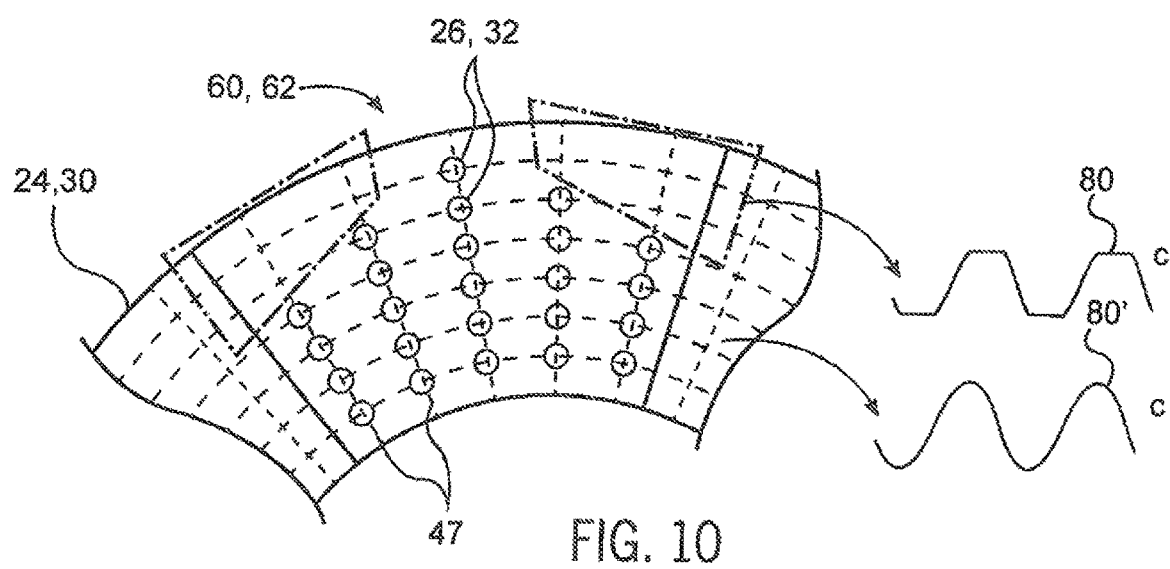
FIG. 10 is a fragmentary elevational view of pegs extending from one of the rotor or stator showing a depopulation of some pegs to provide improved capacitive profile.

Referring now to FIG. 10, the electrodes 26 or 32 of either the rotor 12 or stator 31 may further have their length essentially reduced to zero to modify the capacitive profile exhibited between clusters 60 or 62 as they pass each other. In this case, electrodes 26 or 32 at the peripheral outer edges of radial lines 47 at the leading and trailing side of the clusters 60 and 62 are progressively remove removed as one moves away from a center of the cluster to smooth a trapezoidal capacitive profile waveform 80 between clusters 60 and 62 to a more sinusoidal capacitive waveform 80'. This technique which emphasizes not only length but location may be combined with a nonzero varying lengths of electrodes 26 or 32

Although the rotor electrodes 26 of the rotor clusters 60 may be electrically floating on an insulating rotor disk 24, in one embodiment slip rings 70 may be provided so that a DC bias from a DC power source 72 may be applied across, for example, opposite rotor clusters 60a and 60b providing them with a net charge that will be attracted to opposite charges applied to the stator clusters 62. In this case the opposite stator clusters 62 may also be given different polarities, for example, by providing waveform 64a to a first stator cluster 62 and having waveform 64a' be 180 degrees out of phase with waveform 64a to an opposite stator cluster 62. This ability to provide for repulsive as well as attractive forces between rotor electrodes 26 and stator electrodes 32 raises the possibility of bipolar operation with appropriate phasing of the clusters 62.

Figure 9:
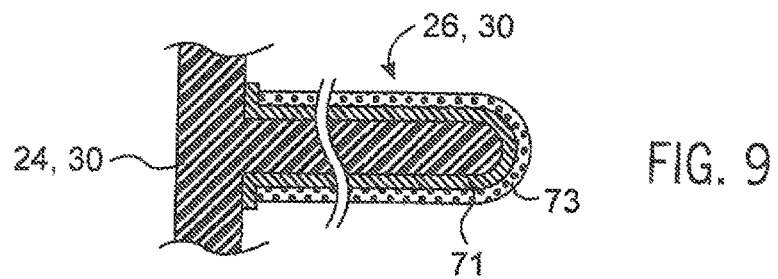
FIG. 9 is a fragmentary cross-section of one rotor or stator peg taken along an axial plane showing use of a conductive coating on an insulating material.

Referring now to FIG. 9, each of the rotor electrodes 26 and stator electrodes 32 need not be fully conductive but only require an outer conductive surface that can support the necessary electrical charge. Accordingly, the rotor electrodes 26 and stator electrodes 32 may be, for example, constructed of injection-molded thermoplastic being electrically insulating and having a high electrical breakdown. This insulating core may be coated with a conductive layer 71, for example, by sputtering or electroplating with a conductive metal such as copper, aluminum, or nickel. The conductive layer 71 may be in turn coated with an insulating material 73 which may also provide a high dielectric constant. Examples of such include titanium dioxide ($TiO_2$) having a dielectric constant (relative permittivity) $\varepsilon_r$ of greater than 80 or barium titanate ($BaTiO_3$) having a dielectric constant $\varepsilon_r$ of greater than 1500. Electrode materials may also be incorporated into the rotor electrodes 26 and stator electrodes 32.

The dielectric fluid 38 may include ferroelectric particles for enhanced permittivity.

II. Encased Peg Designs

A. Flux Shaping Sleeves

Figure 11:
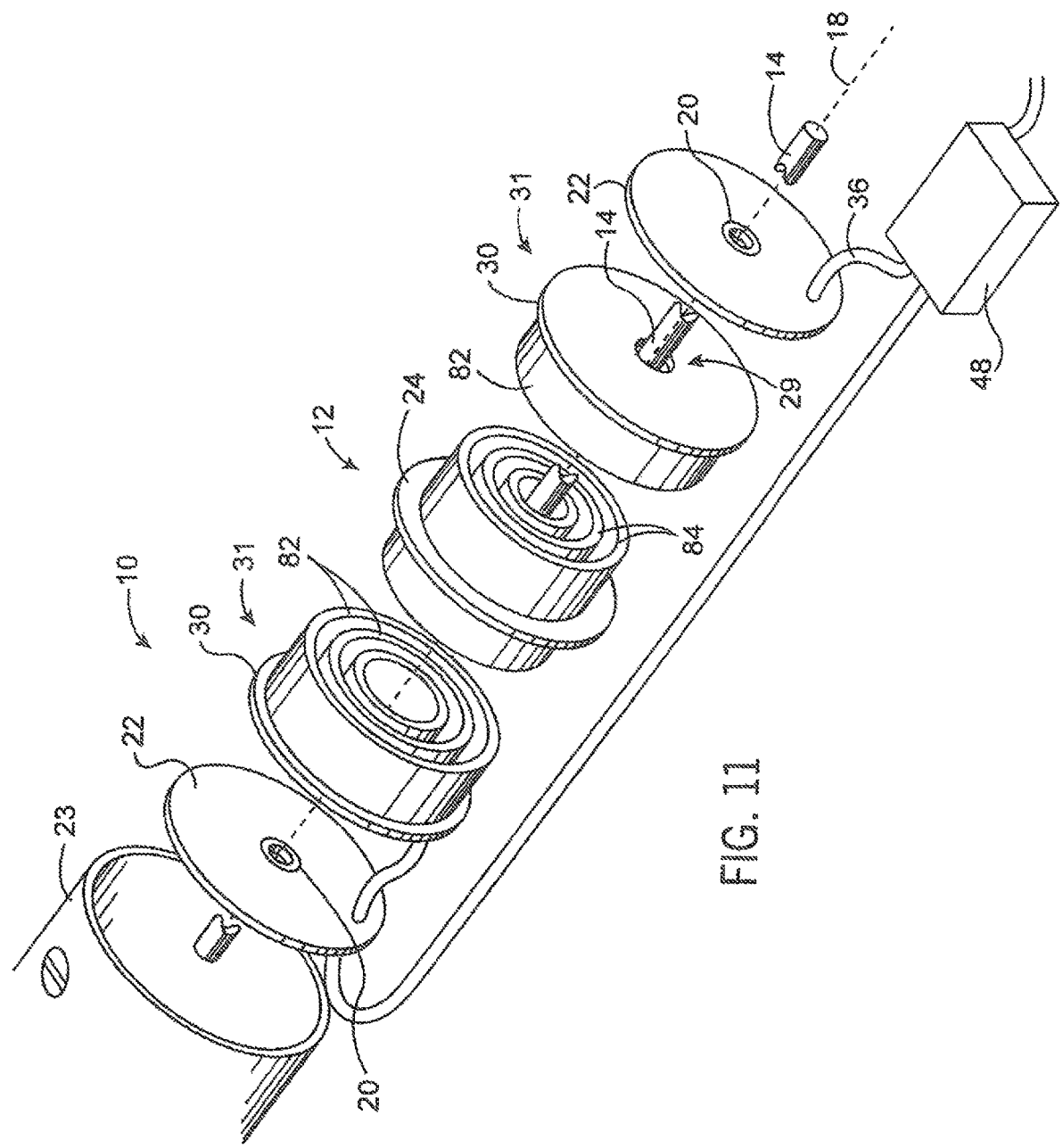
FIG. 11 is a figure similar to that of FIG. 1 showing an alternative embodiment in which the rotor and stator pegs are encased in low relative permittivity sleeves.

Referring to now to FIGS. 1 and 11 in an alternative design, the stator electrodes 32 of FIG. 1 in each circumferential row may be covered with a corresponding dielectric sleeve 82, each dielectric sleeve 82 being concentric about axis 18 and having an axial length substantially equal to the length of the corresponding stator electrodes 32 and having a radially measured thickness that may be varied to be larger than the diameter of the stator electrodes 32 to fully cover the stator electrodes 32 or may be less than the diameter of the stator electrodes 32 to bridge the stator electrodes 32. The thickness may be adjusted to provide the desired electrical properties. Likewise, each circumferential row of rotor electrodes 26 of FIG. 1 may be encased in a corresponding dielectric sleeve 84 also concentric about axis 18 and substantially equal in axial length to the length of the corresponding stator electrodes 32 and with a radial thickness substantially equal to the radial dimension of the stator electrodes 32.

Figure 12A:
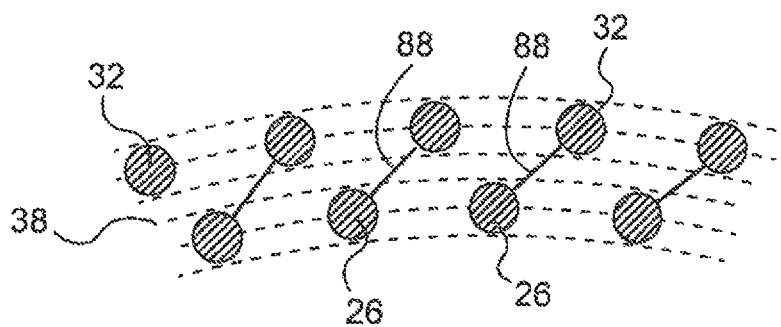
FIG. 12a is a fragmentary cross-section through overlapping pegs of the rotor and stator of FIG. 1
Figure 12B:
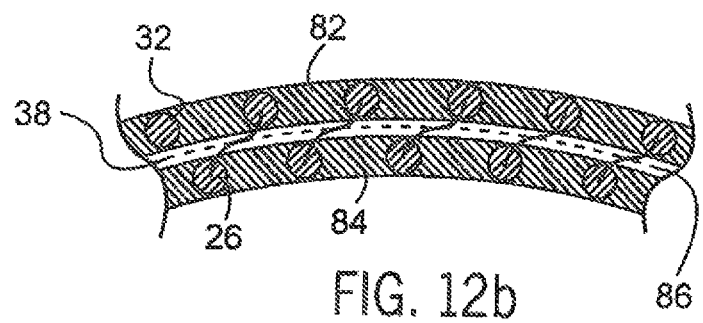
FIG. 12b is a fragmentary cross-sectional view through overlapping sleeves of the rotor and stator of FIG. 11.

As a result, and as shown in FIG. 12b, the sleeves 82 and 84 may interfit in nested fashion in the assembled electrostatic machine 10, the sleeves 82 and 84 separated by radial gaps 86, the latter of which may be filled with dielectric fluid 38. Otherwise, the construction of the electrostatic machine 10 may be substantially as described above with respect to the sleeveless design.

Referring now to FIGS. 12a and 12b, without the sleeves 82 and 84, as shown in FIG. 12a, a central flux line 88 of the electrostatic field lines between any pair of electrodes 32 and electrodes 26 will extend generally in a straight line between those pegs lengthening and shortening as the electrodes 32 and 26 move with respect to each other on the respective stator disks 30 and rotor disk 24. The central flux line 88 will generally define the force vector between the electrodes 32 and 26 and characterize the change of relative capacitance between these electrodes 32 and 26 with rotation reflected in their changing separation distance.

In contrast and as shown in FIG. 12b, if the sleeves 82 and 84 are constructed of a material with relatively low relative permittivity compared to the dielectric fluid 38, the central flux line 88 will curve to preferentially increase its relative path length through the dielectric fluid 38 over its path length through the materials of the sleeves 82 and 84. As noted, because the central flux line 88 practically relates to the electrical separation distance of the electrodes 32 and 26, this curving of the central flux line 88 will change the functional relationship between capacitance and relative rotation of the electrodes 32 and 26. Generally the change in functional relationship will provide a more triangular capacitance profile waveform similar to waveform 42' discussed above, offering the above-described attendant advantages. The material of the sleeves 82 and 84 may have a value of less than three and be constructed of material such as Teflon, acetal, polyethylene or polypropylene and the dielectric fluid 38 may have a value greater than five.

It will be appreciated that the sleeves 82 and 84 displace dielectric fluid 38 to reduce the amount of dielectric fluid 38 required and, by providing a relatively constant interface between the rotor and stator and the dielectric fluid 38, to greatly reduce turbulence in the dielectric fluid 38 such as may create heating or energy loss. In addition, the sleeves 82 and 84 may provide mechanical rigidity to the electrodes 26 and 32, as well as dampening to vibrational resonance. Tensile strength of the sleeves 84 helps resist the effects of centrifugal splaying in the electrodes 26.

More consistent torque may be obtained by staggering, in angle about the axis 18, successive rows of pegs on either the stator or the rotor across successive rows. Similarly, pegs on different but mechanically linked rotors or stators may be staggered with respect to the corresponding pegs on other mechanically linked rotors or stators.

B. Induction Sleeves

Figure 13:
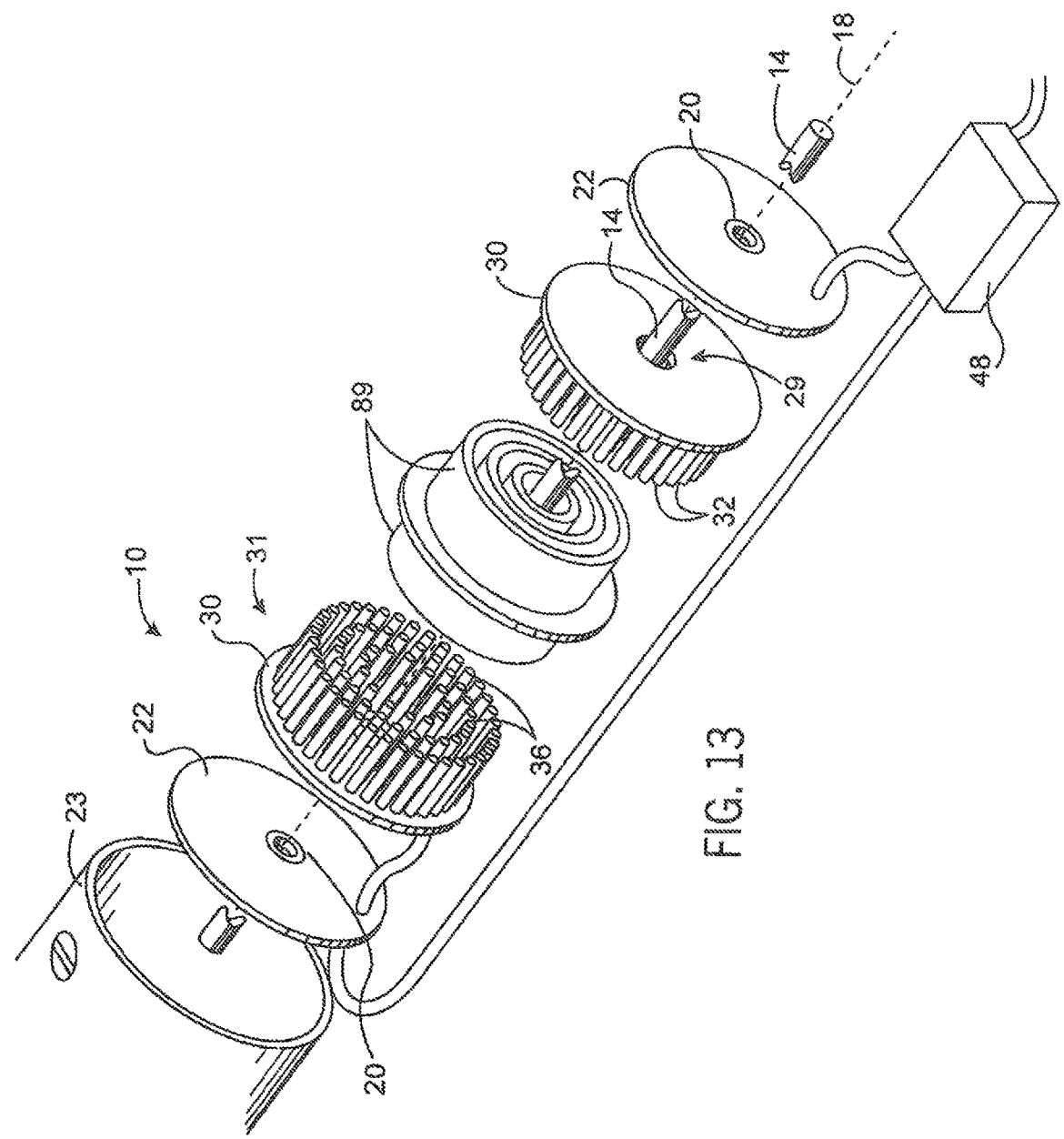
FIG. 13 is a figure similar to that of FIG. 1 showing an alternative embodiment in which rotor pegs are eliminated in favor of a dielectric rotor sleeve with high relative permittivity.

Referring now to FIGS. 1, 12 and 13, in an alternative embodiment, the rotor electrodes 26 may be removed in favor of tubular rotor sleeves 89 identical in size and arrangement to tubular sleeves 84 but without included rotor electrodes 26. The stator pegs 36 may be exposed as depicted or may be covered in the low permittivity sleeves 82 as shown in FIG. 11. Generally the thickness of the sleeve 82 and its material may be adjusted to optimize balance the leakage flux (the flux between the stator pegs that does not couple to the rotor) and the coupling flux (the flux that couples between the stator and rotor to make torque). High permittivity stator sleeve will enhance leakage (which is undesirable) but enhance torque (which is desirable) controlling this trade-off.

In contrast to the stator sleeves 82 or rotor sleeves 84 discussed above, the rotor sleeves 89 are constructed of a dielectric material having a relatively high relative permittivity with the exact material characteristics selected to maximize torque from induced charge within the rotor sleeves 89. Electrical fields established by the stator pegs 36 induce a charge moment in the rotor sleeve 89 that responds to the electrical fields of the stator pegs 36 to provide a net torque.

Figure 15:
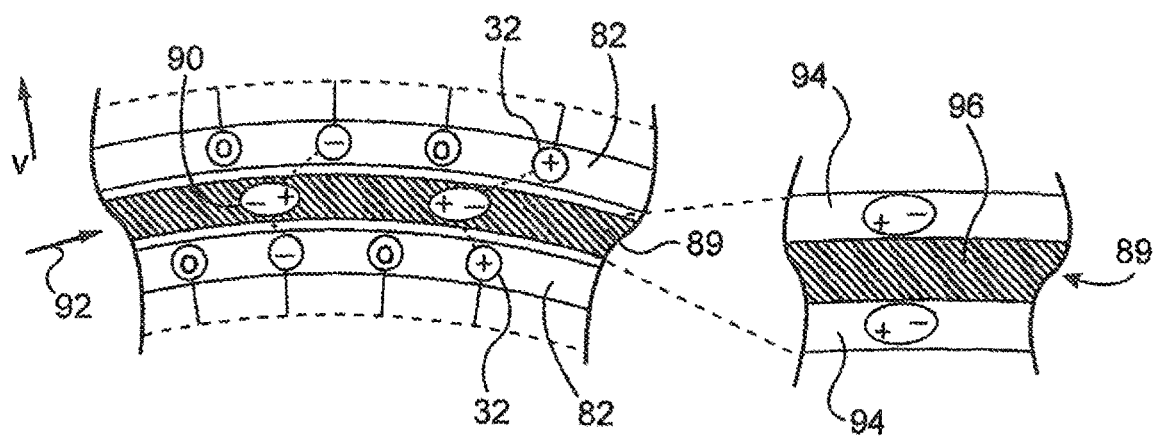
FIG. 15 is a fragmentary detailed depiction of the sleeves of FIG. 14 showing the induction of internal electrical fields within the rotor ring generating torque in, for example, three-phase operation.

Referring now also to FIG. 15, in one example, a phased set of voltages may be applied, to the stator electrodes 32 creating an electrical field extending into the dielectric material of the rotor sleeve 89. There, the electrical field induces electrical dipoles 90 in the material of the rotor sleeve 89. These dipoles 90 provide an electrical field interacting with the electrical field of the stator electrodes 32 to attract the dipoles 90 to the stator pegs 36 causing a net torque 92 on the rotor sleeve 89. The insulating properties and permittivity of the dielectric material of the rotor sleeve 89 create a spatial persistence in the dipoles 90 that may be exploited to maximize this torque as the rotor sleeve 89 moves and the electrical field on the stator electrodes 32 changes. This torque mechanism relies on the slip principle described earlier wherein a difference in the relative velocities of the stator potential wave and rotor exists.

In this embodiment, the rotor sleeve 89 may be a solid dielectric material or may have dielectric material 94 coated on the outer circumferential surfaces of the rotor sleeve 89 with the central material 96, for example, being a stronger or more readily manufactured material such as aluminum coated with barium titanate, as an example. Also the conducting rotor core enhances the electric field as the net distance between the stator pegs and a common or neutral voltage plane is reduced. The rotor core material may or may not be grounded.

Figure 14:
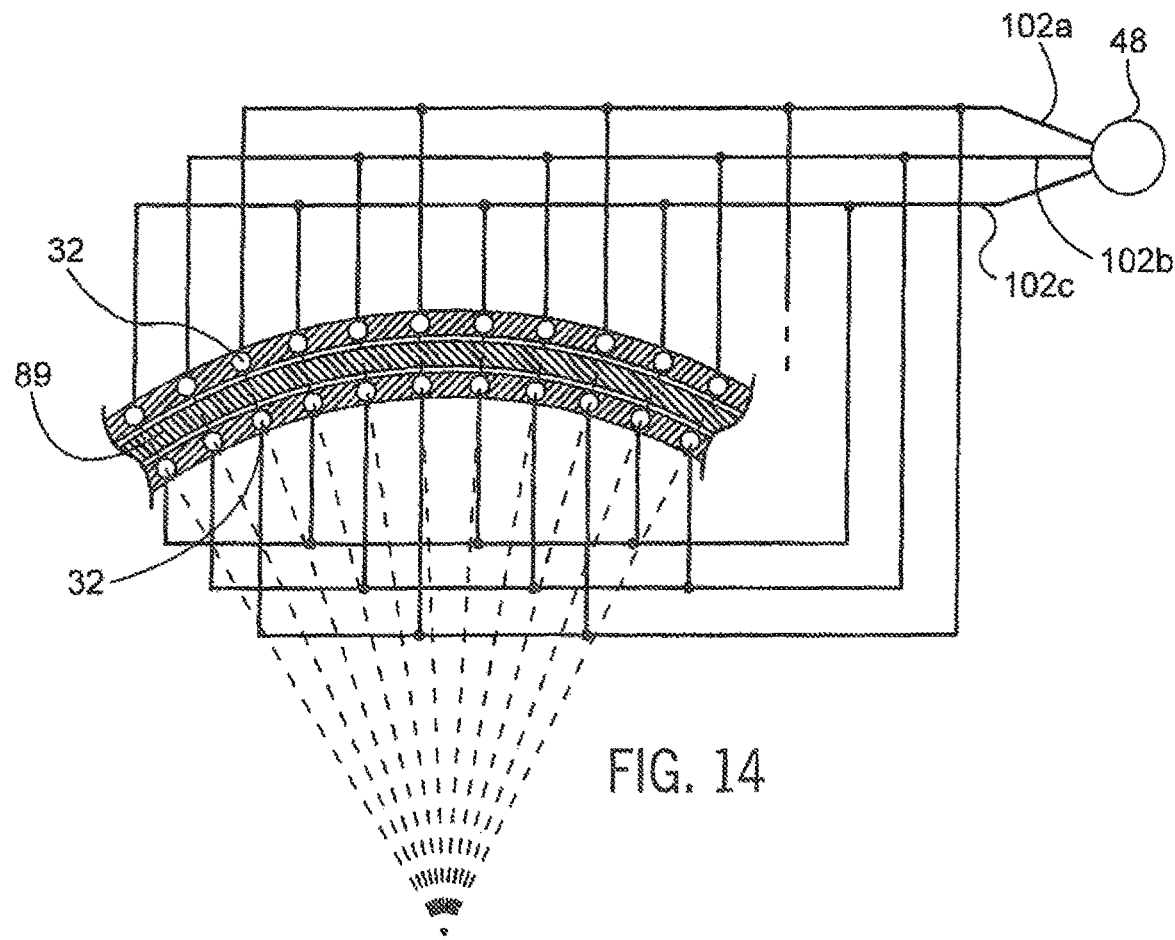
FIG. 14 is a fragmentary cross-section through an alternative embodiment similar to FIG. 11 in which the stator pegs are covered with a sleeve having a low relative permittivity and showing an overlap between the rotor sleeve and several stator sleeves as connected to three-phase power.

Referring to FIG. 14, the necessary traveling voltage waveform may be simply implemented, for example, using a multiphase power supply 100 such as a three-phase power supply whose power maybe created without the need for solid-state wave shaping circuitry but simply through mechanical electrical-generation capabilities well-known in the art. In an example, three phases 102a, 102b, and 102c may provide sinusoidal voltage waveforms of equal amplitude but each shifted with respect to the other two waveforms by 120 degrees. A different phase 102 may be connected to each successive stator electrode 32 as one moves around a circumferential row of stator electrodes 32 such that every third stator electrode 32 is connected to a common phase 102 and no two successive stator electrodes 32 are connected to the same phase 102. As noted in the discussion above, the stator electrodes 32 in successive rows of stator electrodes 32 may be offset in angle along lines of radius to provide more consistent torque. Generally, the stator electrodes 32 in different rows may receive comparable phases 102 to create a similar traveling voltage waveform shifted in phase only by the amount of angular offset of the electrodes 32. It will be appreciated that the terms rotor and stator are arbitrarily linked to a frame of stationary reference and accordingly should not be considered to be limited to elements that rotate or do not rotate. While some embodiments of the invention contemplate a dielectric liquid between the stator and rotor, more generally a dielectric fluid such as a gas may be used and in some embodiments a vacuum may replace any fluid.

III Surface Electrode Designs

Figure 16:
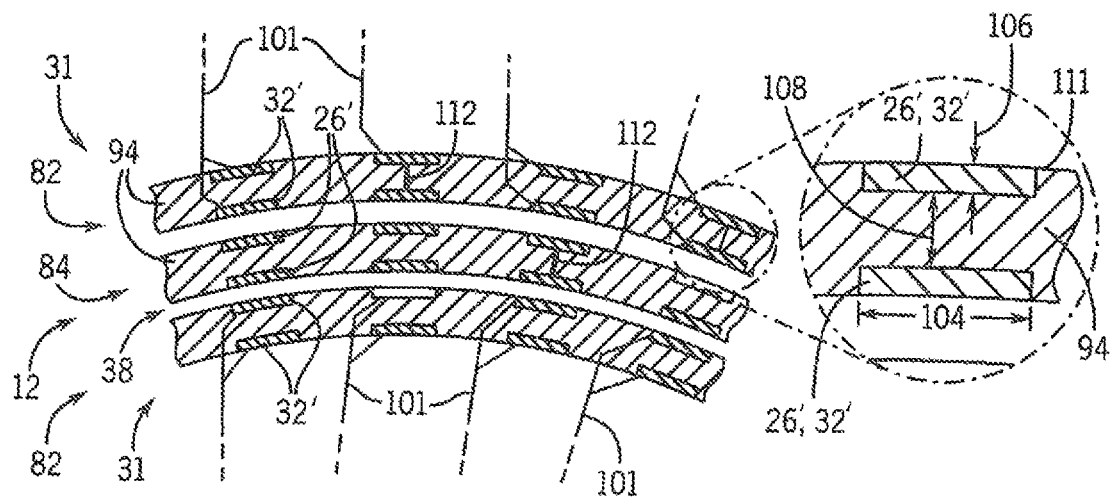
FIG. 16 is a figure similar to that of FIG. 12b showing an improved electrode configuration for stators and rotor.

Referring now to FIGS. 11 and 16, in an alternative embodiment, the stator sleeves 82 and rotor sleeves 84 may provide for a substantially continuous ring of nonconductive material having robust mechanical properties and being of light weight relative to metal electrode materials. The sleeves 82 and 84 may have relatively thin electrodes 26' and 32' applied only at the outer and inner radial surfaces of the cylindrical sleeves 82 and 84. These electrodes 26' and 32' provide similar electrical functionality to the electrodes 26 and 32 described above with respect to FIG. 12b but with significantly reduced total weight and higher torque.

Specifically each of the electrodes 26' and 32' may provide outwardly facing curved planar surfaces generally formed to follow the curvature of the inner or outer radial surfaces of the respective sleeves 82 and 84 which they face, and may be mounted flush along these surfaces to present a smooth radially inner and outer wall to the sleeve 82 and 84 reducing viscous drag with respect to the dielectric fluid 38. For sleeves 82 and 84 which are in between other sleeves 82 and 84, the electrodes 26' and 32' will be on both, opposed, radial surfaces of the rings 82 and 84 typically, but not necessarily, in alignment. Generally, each electrode 26' and 32' will have a circumferential width 104 (also denoted w) at least 10 times its radial thickness 106 (also denoted d) although this ratio will be much higher for very thin electrodes possible with this design. Correspondingly, the material of the sleeve 82 or 84 positioned inside and supporting the electrodes 26' or 32' between those radial outer surfaces of the sleeves 82 or 84 typically will have a thickness 108 much greater than thickness 106 and typically at least five times greater so that the strength of the sleeves 82, 84 may be defined largely by the dielectric material 94 or other insulating material rather than the electrodes 26' and 32' allowing the latter to be extremely thin, for example, possible with a sputtered or chemically deposited coating, use of adhered foil, or the like.

Electrodes 26' or 32' may be embedded in the dielectric material 94 or other insulating support, for example, by insert-injection molding or by using an adhesive in prepre-pared slots or grooves. The electrodes 26' and 32', in this regard, may have undercutting teeth 111 or the like preventing their easy dislodgment from the rings 82 or 84 with centrifugal force, shock or the like. Alternatively, very thin electrodes 26' and 32' may be applied directly on the surface of the sleeves 82, 84 to provide practically smooth and continuous surfaces. Generally the invention contemplates a variety of fabrication techniques including stitching, sewing, adhesion, mechanical in-molding, chemical or electrical deposition, subtractive etching or laser cutting and the like.

Generally the electrodes 26' on the sleeve 84 of the rotor 12 may be fully separated by an interior layer of dielectric material 94 without electrical connection therebetween or with other electrodes 26'. Alternatively, an electrical connection between opposed electrodes 26' on a single sleeve 84 may be provided, for example, as described below or by means of rivets or vias 112 (only one shown for example). In this latter case only small portions of the dielectric material 94 are disrupted to prevent any reduction in its mechanical strength.

In contrast, the electrodes 32' of the rings 82, for any rings 82 that are flanked by rotor rings 84, will have their opposed electrodes 32' electrically joined together either as described below or by means of rivets or vias 112 (only one shown for example). Each pair of electrodes will be joined to a conductor 110 leading to a power supply 48, for example, of a type as described with respect to FIG. 14.

Figure 17:
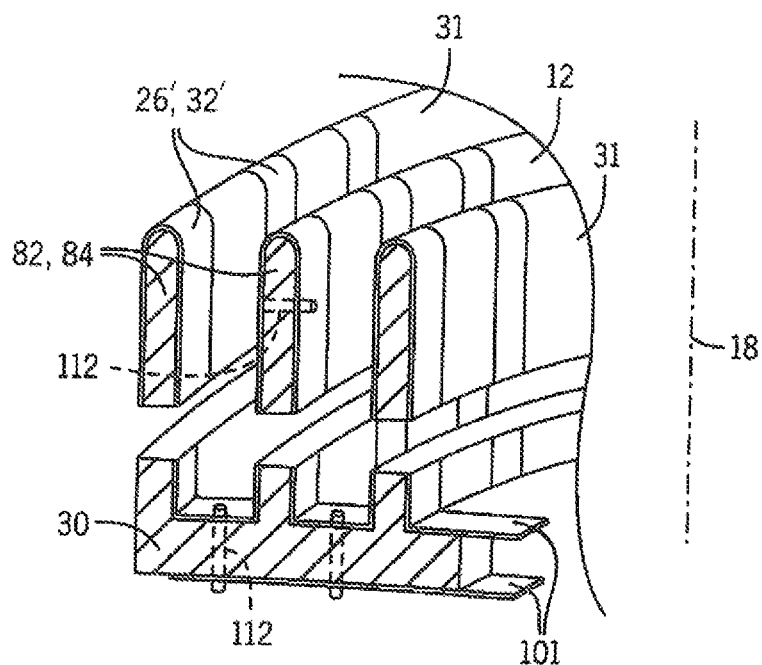
FIG. 17 is a fragmentary perspective cross-sectional view of the rotors and stators of FIG. 16 showing one method of applying the electrode material.

Referring now to FIG. 17, in one embodiment, the electrodes 26' or 32' may be applied to the outer surfaces of the successive concentric rings 82 or 84 as a metal band following the outer surfaces of each of the rings 82 or 84 in a radial direction. Specifically electrodes 26' or 32' may each provide a set of loops extending axially up one side of each sleeve 82, 84 and then back down the other side to successively go over successive ranks of the rings 82 or 84 for either the stator 31 or rotor 12 so that radially aligned electrodes 26' or 32' are electrically interconnected. For the stator 31 only, rivets or vias 112 may pass through the stator disk 30 to connect the electrode 32' with the power supply via a conductor 101 positioned conveniently on an opposite side of the stator disk 30, or a center conductor 110 may be used in the case where there are rotors 12 on each side of the stator 31 and a free side of the stator disk 30 is not available.

Figure 18:
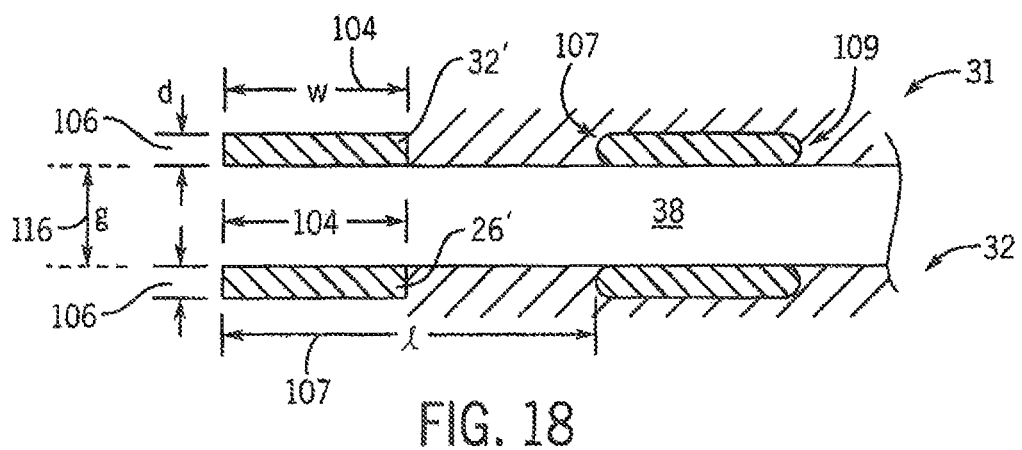
FIG. 18 is a simplified cross-section of the electrodes on one rotor and one stator showing dimensions with respect to optimization.
Figure 19:
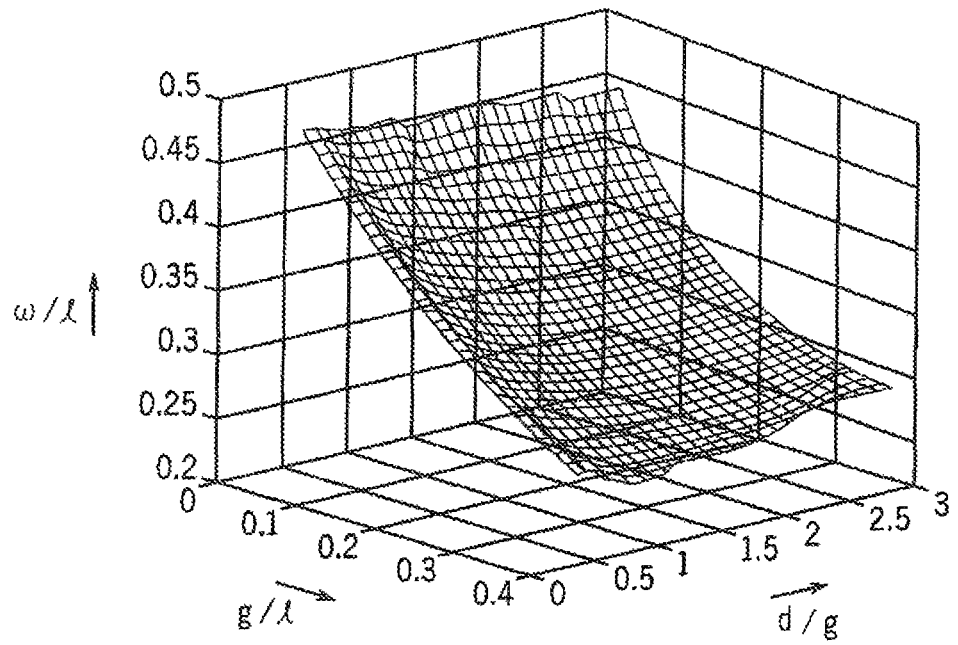
FIG. 19 is a depiction of an optimization surface for selecting the values of the electrode with separation and stator/rotor separation.

Referring now to FIGS. 18 and 19, each electrode 32' or 26' may have a circumferential width 104 (w) as described above with respect to FIG. 16, a radial thickness 106 (d) as also described above and a circumferential period 107 (l) being the spacing between corresponding edges of successive electrodes 26' or 32' along the circumference of each sleeve 82 or 84. In addition, the electrodes 32' may be radially separated from the electrodes 26' by a gap distance 116 (g) normally filled with dielectric fluid 38. These dimensions for electrodes 26' or 32' having generally rectangular cross-sections may be optimally interrelated according to the following equation (1) to maximize produced torque:

$$\frac{w}{l} = \sum_{0 \le i,j \le 5} c_{ij} \left(\frac{g}{l}\right)^i \left(\frac{d}{g}\right)^j \pm 5\%$$

where:

$c_{00} = 0.4875$
$c_{01} = 0.03947$
$c_{02} = -0.01841$
$c_{03} = 0.007389$
$c_{04} = -0.002732$
$c_{05} = 0.0003844$
$c_{10} = -0.1742$
$c_{11} = -1.632$
$c_{12} = 0.565$
$c_{13} = -0.09538$
$c_{14} = 0.008316$
$c_{15} = 0$
$c_{20} = -1.456$
$c_{21} = 4.766$
$c_{22} = -0.663$
$c_{23} = 0.002834$
$c_{24} = 0$
$c_{25} = 0$
$c_{30} = 1.207$
$c_{31} = -6.1$
$c_{32} = 0.3677$
$c_{33} = 0$
$c_{34} = 0$
$c_{35} = 0$
$c_{40} = 3.884$
$c_{41} = 3.007$
$c_{42} = 0$
$c_{43} = 0$
$c_{44} = 0$
$c_{45} = 0$
$c_{50} = -4.128$
$c_{51} = 0$
$c_{52} = 0$
$c_{53} = 0$
$c_{54} = 0$
$c_{55} = 0$

Figure 20:
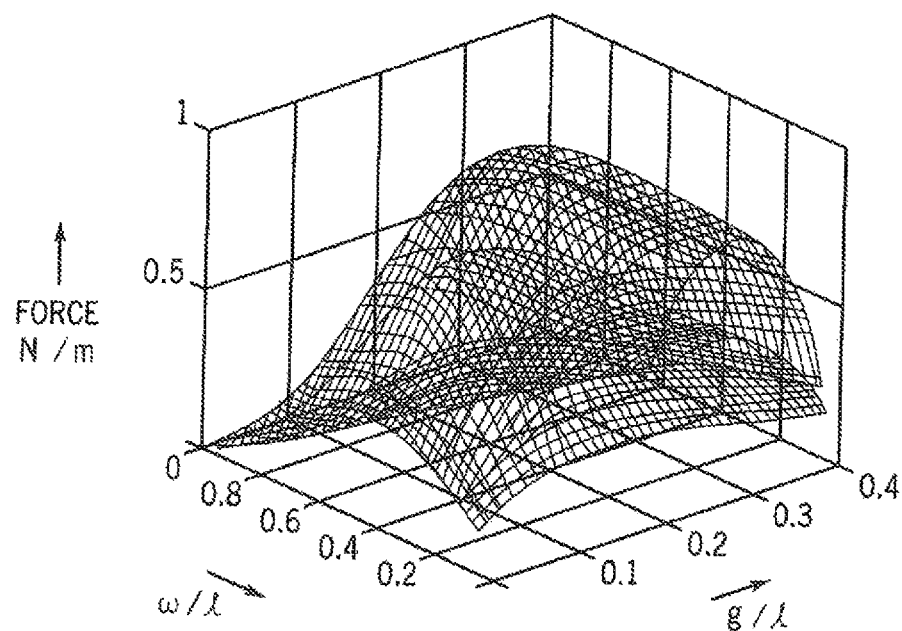
FIG. 20 is a figure similar to FIG. 19 showing optimum electrode size and spacing for maximizing torque.

Referring now to FIG. 20, generally maximum torque will be obtained with a width to periodicity ratio (w/l) of 0.2 to 0.6 maximizing at approximately 0.4, and maximum torque will be obtained at a gap-to-length ratio (g/l) of 0.1 to 0.3 maximizing at approximately 0.2.

In one embodiment, the circumferential (narrow) edges of the electrodes 32' and 26' may formed as rounded edges 109 (for example, being of constant radius equal to half of the thickness 106) to provide for low propensity for coronal discharge.

Figure 21:
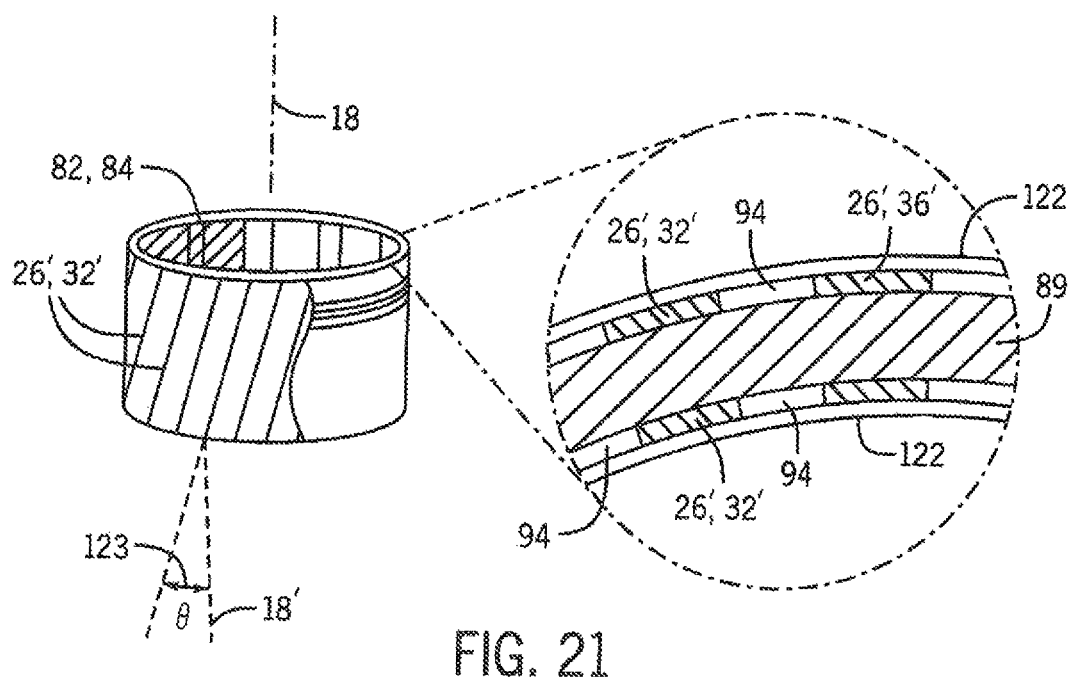
FIG. 21 is a perspective view of a rotor component showing electrode skewing and in partial cutaway, fiber reinforcement, and in a cross-sectional inset fiber reinforcement and conformal coating of the electrodes.

Referring now to FIG. 21, by moving the electrodes 26' and/or 32' to radial outer surfaces of the rings 82 and 84 from their interiors, the rings 82 and 84 may be more easily constructed of an integrated high-strength material, for example, a polymer including wrapped or chopped glass or carbon fibers 118 for high resistance to deformation in tension or sheer during operating speeds and forces. As discussed above, the electrodes 26' or 32' may be embedded in dielectric material 94, the latter positioned on the circumferential sides of the electrodes 26' or 32'. The dielectric material 94 and electrodes 26' or 32' may be supported entirely by dielectric material 94 filling in between electrodes 26' or 32' on opposite sides of a given sleeve 82, 84, or alternatively a different material may be used for the rotor sleeve 89 interior to the sleeves 82 and 84 having different dielectric and less favorable) properties but typically being lighter weight than the electrode material of electrodes 26' and 32'. The inner and outer radially opposed surfaces of the sleeves 82 and 84 may be coated with an electrically neutral protective coating 122, for example, to protect the electrodes 26' and 32' from the dielectric fluid 38 or abrasion. Generally this material is desired to have relatively high permittivity, for example, equal to or greater than that of the dielectric fluid 38. The coatings on the surface of the conductors should have a x/epsilon (thickness of coating over permittivity coating material) that is an order of magnitude (10×) smaller than the gap's ratio (stator-rotor gap distance over liquid permittivity) This will ensure most of the field is dropped across the gap to make torque As also shown in FIG. 21, the electrodes 26' and 32', using the present fabrication technique, may be skewed with respect to axis 18 by an angle 123 (θ) to provide for reduced torque fluctuation. In this regard the electrodes 26' and 32' lie, on the outer cylindrical surface and inner cylindrical surface of the sleeves 82 and 84 but are skewed by angle 123 with respect to axial lines 18' also relying on those surfaces and parallel to axis 18.

In all other respects this latter embodiment may share the characteristics of the previous embodiments and vice versa.

Figure 22:
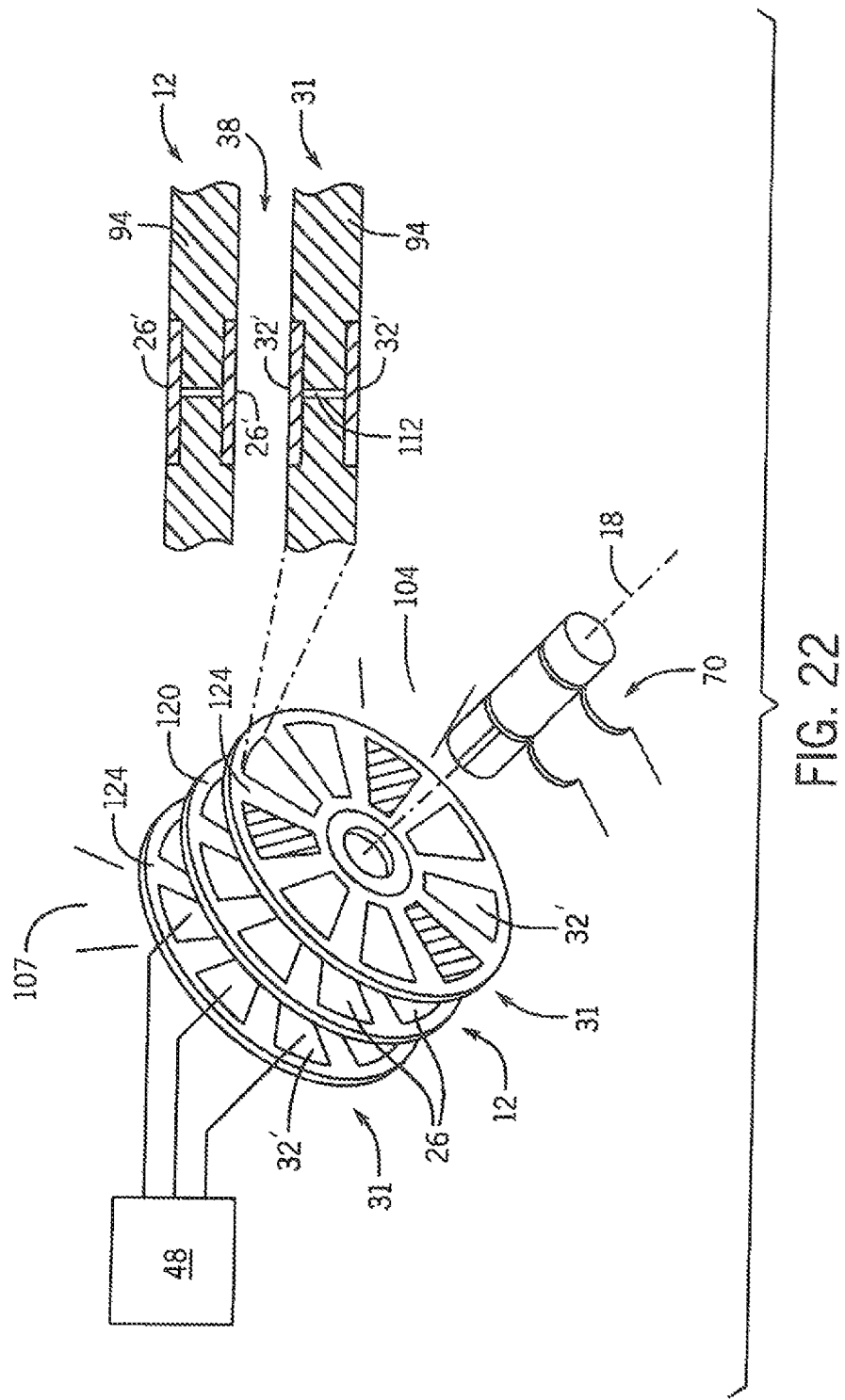
FIG. 22 is a perspective view of an alternative embodiment of the invention using axially extending disks rather than concentric shells and showing a cross section of the disks to illustrate electrode placement analogous to that shown in FIG. 18.

Referring now to FIGS. 18 and 22, in an alternative embodiment, the stator 31 and rotor 12 may be disks (124 and 126) respectively extending radially from axis 18 to provide for a planar extension of nonconductive material being of light weight relative to metal electrodes 26' and 32' applied only at the outer and inner axial surfaces of the disks 124, 126. These electrodes 26' and 32' provide similar electrical functionality to the electrodes 26' and 32' described above with respect to FIGS. 16-18 but with forces developed between axially displaced rotor and stator elements rather than radially displaced rotor and stator elements.

Specifically each of the electrodes 26' and 32' may provide outwardly facing pie-shaped planar surfaces generally formed to follow lines of radius along the circular disk surfaces, and may be mounted flush along these surfaces to present a smooth axial inner and outer wall to the disks 124, 126 reducing viscous drag with respect to the dielectric fluid 38. For disks 124, 126 which are in between other disks 124, 126, the electrodes 26' and 32' will be on both, opposed, radial surfaces of the disks 124 126, typically, but not necessarily, in alignment. Generally, each electrode 26' and 32' will have a circumferential width 104 (also denoted w) at least 5 times its radial or axial thickness 106 (also denoted d) although this ratio will be much higher for very thin electrodes possible with this design. Correspondingly, the material of the disks 124, 126 positioned inside and supporting the electrodes 26' or 32' between those axial outer surfaces of the disks 124, 126 typically will have a thickness 108 (shown in FIG. 18) much greater than thickness 106 and typically at least five times greater so that the strength of the disks 124, 126 may be defined largely by the dielectric material 94 or other insulating material rather than the electrodes 26' and 32' allowing the latter to be extremely thin, for example, possible with a sputtered or chemically deposited coating, use of adhered foil, or the like.

As discussed above, the electrodes 26' or 32' may be embedded in the dielectric material 94 or other insulating support, for example, by insert-injection molding or by using an adhesive in preprepared slots or grooves. The electrodes 26' and 32', in this regard, may have undercutting teeth 111 or the like preventing their easy dislodgment from the rings 82 or 84 with centrifugal force, shock or the like. Alternatively, very thin electrodes 26' and 32' may be applied directly on the disks 124 and 126 to provide practically smooth and continuous surfaces. Generally the invention contemplates a variety of fabrication techniques including stitching, sewing, adhesion, mechanical in-molding, chemical, or electrical deposition, subtractive etching or laser cutting and the like.

Generally the electrodes 26' on the disk 126 of the rotor 12 may be fully separated by an interior layer of dielectric material 94 without electrical connection therebetween or with other electrodes 26'. Alternatively, an electrical connection between opposed electrodes 26' on a single disk 126 may be provided, for example, as described below or by means of rivets or vias 112. In this latter ease only small portions of the dielectric material 94 are disrupted to prevent arty reduction in its mechanical strength. In some versions the electrodes 26' of the rotor disks 126 may connect to slip rings 70 to be provided with a connection to an external source of electrical voltage polarizing the electrodes 26'. A similar arrangement may be adopted with respect to the configuration of FIGS. 16-18 discussed above.

In contrast, the electrodes 32' of the stator disks 124 that are flanked by rotor rings 84, will have their opposed electrodes 32' electrically joined together either as described below or by means of rivets or vias 112. Each pair of electrodes will be joined to a conductor 110 leading to a power supply 48, for example, of a type as described with respect to FIG. 14. The electrodes 26; and 32; may also be skewed with respect to lines of radius and include other features described with respect to FIG. 21 as modified by this topology.

It will be appreciated that to the extent that the electrical properties of the stator can be largely separated by the structural stator elements, that the structural stator elements may be readily fabricated by variety of techniques including injection molding and the like. It is possible therefore to construct the stator elements as part of the housing of the motor itself to provide a high degree of integration of the structure.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will be generally understood that the electrical machines described herein may be operated either as motors or generators and in the latter case that the tailoring of the capacitive profile may be done to provide a desired output waveform. It will be appreciated that the invention can be used for electrostatic machine configured for any torque mechanism including synchronous operation, separately excited rotor operation, induction (slip) operation, and saliency (variable capacitance), or any combination thereof.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electrostatic machine comprising:
   a first and second stator assembly providing an insulating support extending circumferentially about an axis;
   a rotor assembly providing an insulating support extending circumferentially about the axis and supported to rotate about the axis with respect to the first and second stator assembly,
   wherein the insulating supports of the first and second stator assembly and rotor assembly, respectively, support circumferentially displaced conductive stator electrodes and circumferentially displaced conductive rotor electrodes;
   wherein the conductive stator electrodes and conductive rotor electrodes present mutually opposed surfaces across a gap between the first and second stator assembly and rotor assembly without mechanical contact between the opposed surfaces or between the opposed surfaces and intervening solid bearing materials, the surfaces extending along coaxial circular paths having a common axis;
   a liquid dielectric positioned in the gap between the opposed surfaces of the first and second stator assembly and rotor assembly and having a dielectric constant of at least five; and
   wherein the insulating supports together with the conductive stator electrodes and conducting rotor electrodes of the first and second stator assembly and rotor assembly present substantially smooth and continuous surfaces having uniform separation across the gap and following the coaxial circular paths on opposite sides of the gap; and
   wherein a thickness of the conductive rotor electrodes and the conductive stator electrodes is less than a thickness of the insulating support beneath the conductive rotor electrode measured perpendicularly to the mutually opposed surfaces of the first and second stator assembly and rotor assembly;
   wherein the insulating supports of the rotor assembly and the first and second stator assembly are tubular sleeves of nonconductive support material concentrically supported on radially extending insulating plates, the tubular sleeves having radially opposed inner and outer surfaces positioned circumferentially about the axis and wherein the plurality of circumferentially spaced conductive stator electrodes are supported on at least one of the inner and outer surfaces to face corresponding conductive rotor electrodes of the rotor; and
   wherein the rotor electrodes on opposite sides of the tubular sleeves communicate with other electrodes on the rotor and with power conductors by means of conductive vias passing through the insulating supports and passing through the radially extending insulating plates.

2. The electrostatic machine of claim 1 wherein the tubular sleeve of nonconductive support material provides a low relative permittivity material circumferentially adjacent to the plurality of axially extending conductive rotor electrodes, the low permittivity material having a permittivity less than that of the liquid dielectric.

3. The electrostatic machine of claim 2 wherein the low permittivity material has a permittivity of less than five.

4. The electrostatic machine of claim 3 wherein the liquid dielectric material has a dielectric constant of at least live and a viscosity less than 100 cP.

* * * * *